No. 739,680. PATENTED SEPT. 22, 1903.
F. C. JOHNSON.
LUGGAGE CARRIER FOR BICYCLES.
APPLICATION FILED APR. 4, 1903.
NO MODEL.
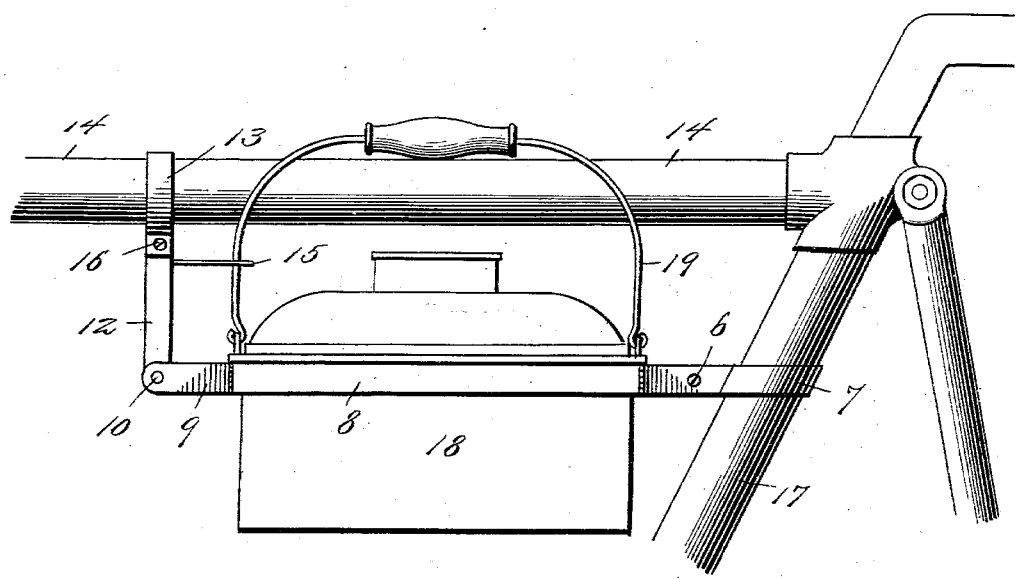
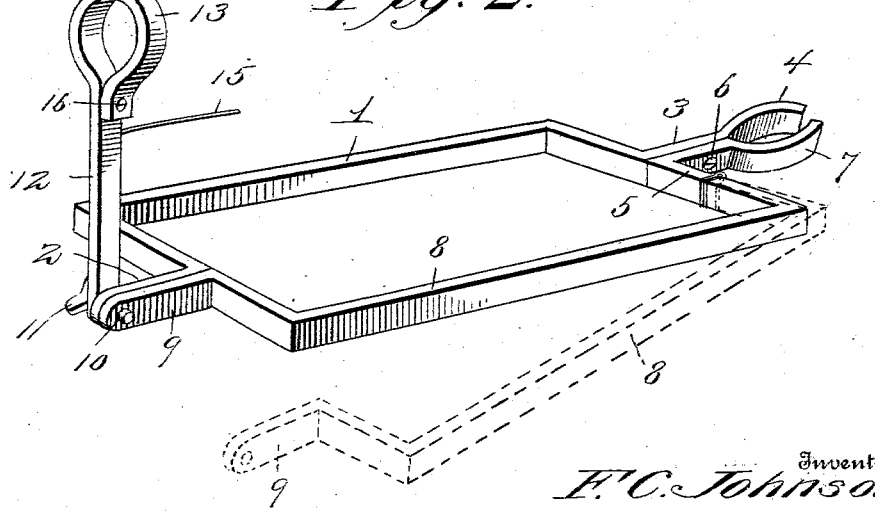
Inventor
F. C. Johnson,
By Victor J. Evans
Attorney.
Witnesses No. 739,680. Patented September 22, 1903.

UNITED STATES PATENT OFFICE.

FRED C. JOHNSON, OF CLOQUET, MINNESOTA.

LUGGAGE-CARRIER FOR BICYCLES.

SPECIFICATION forming part of Letters Patent No. 739,680, dated September 22, 1903.

Application filed April 4, 1903. Serial No. 151,166. (No model.)

*To all whom it may concern:*

Be it known that I, FRED C. JOHNSON, a citizen of the United States, residing at Cloquet, in the county of Carlton and State of Minnesota, have invented new and useful Improvements in Luggage-Carriers for Bicycles, of which the following is a specification.

My invention relates to new and useful improvements in luggage-carriers for bicycles; and its object is to provide a simple and inexpensive device of this character which may be readily attached to the frame of a bicycle and which is especially adapted for holding a lunch-pail in position thereon.

The invention consists in providing a preferably rectangular frame, one side of which is adapted to swing outward to permit the pail to be inserted thereinto. Means are provided for securing this hinged side in closed position upon the pail, and holding devices are employed whereby the frame may be securely fastened to the frame of the bicycle.

The invention also consists in the further novel construction and combination of parts hereinafter more fully described and claimed, and illustrated in the accompanying drawings, showing the preferred form of my invention, and in which—

Figure 1 is a side elevation of the device in position upon a bicycle, and Fig. 2 is a perspective view of the device detached and showing in dotted lines the movable side in opened position.

Referring to the figures by numerals of reference, 1 is an angular bar having arms 2 and 3 extending from opposite sides thereof, the arm 3 having a curved extension 4, which forms one member of a clamp. An L-shaped bar 5 is secured to arm 3 in any suitable manner, as by means of a screw 6, and this bar also has a curved extension 7, similar to extension 4 and arranged opposite thereto. Hinged to one end of bar 5 is an angular side bar 8, equal in length to the bar 1, before referred to, and having an arm 9 at its free end, which is similar to the arm 2 before referred to. Apertures 10 are formed within the arms 2 and 9 for the reception of a thumbscrew 11, which projects through the lower end of a hanger 12, having a loop 13 at its upper end adapted to inclose the horizontal bar 14 of a bicycle-frame. A spring-finger 15 extends rearwardly from the hanger 12 for the purpose hereinafter more fully described.

To place the carrier upon the frame of a bicycle, the loop 13, which is preferably formed of spring metal, is sprung over the horizontal bar 14 and secured in position by means of a screw 16 or any other suitable device. Arm 3 and bar 5 are then placed at opposite sides of the adjacent upwardly-extending bar 17 of the bicycle-frame and the extensions 4 and 7 thereof clamped upon said bar by means of the screw 6. The side bar 8 is then swung outward, as shown in dotted lines in Fig. 2, and the lunch-pail 18 placed between it and the angular bar 1. Said side bar is then swung inward, and the thumbscrew 11, after first being inserted into the hanger 12, is screwed into the apertures 10 in the arms 2 and 9, thereby binding the two arms together and permitting the pail to be suspended upon the frame of the luggage-carrier. The spring-finger 15 serves to hold the handle 19 of the lunch-pail in an upright position and against the horizontal bar 14.

It will be understood that the carrier herein described can be readily attached to a bicycle-frame, and a lunch-pail can be quickly placed therein and removed therefrom.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. In a device of the character described, the combination with a frame having a hinged side; of a clamp at one end of the frame for engaging one of the bars of a bicycle-frame, a hanger for engaging the horizontal bar of a bicycle-frame, and means for detachably securing the hanger to the frame of the luggage-carrier.

2. In a luggage-carrier of the character described, the combination with a frame comprising an angular bar, an angular side hinged thereto, and similar arms extending from said bar and side; of a clamp formed integral with the frame and adapted to engage one of the bars of a bicycle-frame, a hanger adapted to engage the horizontal bar of a bicycle-frame, and means for detachably securing said hanger to the arms of the angular bar and the hinged side.

3. In a luggage-carrier of the character described, the combination with a hanger; of an angular bar, arms at opposite ends thereof, an angular bar secured to one of the arms and adapted with said arm to form a clamp, a hinged angular bar having an arm at one end thereof, and means for securing said arm and one of the first-mentioned arms to the hanger.

4. A luggage-carrier of the character described comprising a frame formed of two sections hinged together, arms at opposite ends of said sections, a clamp formed by two of the arms, a hanger, a spring-loop at one end thereof, a spring-finger upon the hanger, and means for detachably securing the remaining arms of the frame to the hanger.

In testimony whereof I affix my signature in presence of two witnesses.

FRED C. JOHNSON.

Witnesses:
LEROY A. FISH,
WALTER L. CASE.